US007252463B2

(12) United States Patent
Valdez

(10) Patent No.: US 7,252,463 B2
(45) Date of Patent: Aug. 7, 2007

(54) DOUBLE-SIDED ULTRA-THIN DOOR MARKING TEMPLATE

(76) Inventor: Andrew Valdez, 918 Claire Ct., Ocean Shores, WA (US) 98569

( * ) Notice: Subject to any disclaimer, the term of this patent is extended or adjusted under 35 U.S.C. 154(b) by 0 days.

(21) Appl. No.: 10/820,526

(22) Filed: Apr. 7, 2004

(65) Prior Publication Data

US 2006/0104730 A1 May 18, 2006

(51) Int. Cl.
*B23B 47/28* (2006.01)

(52) U.S. Cl. .................. 408/115 R; 408/3; 408/241 B; 33/562; 33/194; 33/667

(58) Field of Classification Search .................... 408/3, 408/97, 103, 115 R, 241 B; 33/194, 666, 33/562, 563, 667, 566
See application file for complete search history.

(56) References Cited

U.S. PATENT DOCUMENTS 2,634,507 A * 4/1953 Boatwright .................. 33/197
2,733,517 A * 2/1956 Gjersoe ....................... 33/666
3,082,651 A * 3/1963 Patrick, Jr. ................ 408/72 R
4,257,166 A * 3/1981 Barker et al. ........... 408/241 G
4,449,867 A * 5/1984 Dergo ........................ 408/103
4,715,125 A * 12/1987 Livick ......................... 33/197
5,058,285 A * 10/1991 Morita et al. ................. 33/563
5,114,285 A * 5/1992 Brydon ................... 408/115 R
5,573,352 A * 11/1996 Matadobra .................. 409/132
5,666,737 A * 9/1997 Ryan, III ..................... 33/562
6,193,449 B1 * 2/2001 Diaz ...................... 408/115 R
6,243,961 B1 * 6/2001 Winski ........................ 33/526
7,189,034 B1 * 3/2007 Zeilinger et al. ........... 408/1 R
2004/0020809 A1 * 2/2004 Allan et al. ................. 206/371
2004/0141822 A1 * 7/2004 Hiller ..................... 408/115 R

* cited by examiner

*Primary Examiner*—Daniel W. Howell
*Assistant Examiner*—Sara Addisu
(74) *Attorney, Agent, or Firm*—Patent Forge; John Anderton

(57) ABSTRACT

A square channel shaped template of ultra-thin rigid plastic, metal or other material has one or more mating configurations of pencil-point-size marking holes in the two opposing faces of the channel. Each configuration of marking holes matches a configuration of screw holes on a door fixture or door hardware to be mounted on a door. Each configuration of holes may be distinguished by a visible line through the marking holes of each configuration. The template straddles an edge of a door at a measured distance along the edge and fits on the edge with the door closed in a door frame for marking either one or both sides of the door with a mating configuration of marks on the door for drilling.

4 Claims, 4 Drawing Sheets

DOUBLE-SIDED ULTRA-THIN DOOR MARKING TEMPLATE

BACKGROUND OF THE INVENTION

1. Field of the Invention

The present invention relates to templates used to mark doors for drilling and in particular to a double-sided ultra-thin reusable template for marking hole drilling locations on doors for mounting fixtures, which template straddles an edge of a door and is sufficiently thin to allow the door to be closed with the template in place to align with elements on the frame with small pencil point size holes on the template on both sides of the door for marking purposes only, not intended for drilling so that the template is reusable 2. Description of the Prior Art It is essential to provide accurate drilling of holes in doors for mounting hardware, such as automatic door closures and door knob and lock hardware. The door will not function properly without precise alignment of the hardware elements on the door. Prior art devices are primarily intended for drilling through large screw-sized holes in the template so that the template normally can be used only once due to damaging the holes and the accuracy of the template during drilling. Furthermore the prior art door template patents are for devices which are too thick to be in place on the door with the door closed in the frame and therefore the prior art templates do not provide accurate alignment with mating elements on the door frame.

U.S. Pat. No. 5,573,352, issued Nov. 12, 1996 to Matadobra, claims a unitary door routing template for routing hardware mounting apertures in doors which affords expedient placement of the template and the cutting of hardware mounting holes while minimizing expense and hazards to operating personnel. The template comprises two elongated, planar, unobstructed, opposing sides for engaging the front and back sides of a door, the template sides being integrally formed with and extending generally perpendicular to an end plate which engages the door edge. The planar opposing sides are spaced from each other at the end plate by a distance equal to or slightly greater than the thickness of the door and, preferably, gradually converge away from the end plate so that, when placed over the door, they provide a stabilizing grip on the door surfaces. The entire template, and particularly the template in the vicinity of the router guide holes, is preferably formed of flexible friable material, such as plastic, and has a thickness greater than ¼ inch to prevent disintegration of carbide router bits in use due to kick-back and contact of the bit with the template.

U.S. Pat. No. 5,114,285, issued May 19, 1992 to Brydon, shows a three-sided drilling template for a door that is formed from a rigid material. The first and second sides of the template are parallel and contact opposite sides of the door. The third side of the template, orthogonal to and bridging the span between the first and second sides of the template, contacts the edge of the door. A plurality of through guide holes are located in each side of the template and mark the centers of mounting holes for the mounting of operating hardware such as door locks and knobs. Markings on the template indicate the specific purpose of each through guide hole, and marked circles concentric with the through guide holes indicate the correct size of the mounting holes. A rectangular extension on the interior surface of the third side fits into a lock face recess previously formed or pre-machined in the edge of the door for accurate alignment of the template to the door.

U.S. patent application No. # 20040020809, filed Feb. 5, 2003 by Allan, et al., provides a template assembly for locating required mounting holes for door lock that has a generally U-shaped flexible end template, support clips pivotably attached to free ends of the end template, and side templates attached to the support clips. The end template has a center hole locating mark, and the side templates have lock cylinder hole locating marks and a strike plate hole locating mark. Alternatively, the side templates are pivotably attachable directly to the free ends of the end template. Alternatively, the template assembly is a one-piece construction, having integrated end template and side templates, the side templates not being pivotable relative the end template.

U.S. Pat. No. 6,193,449, issued Feb. 27, 2001 to Diaz, describes a 3 sided bracket shaped template for accurately drilling door knob and lock holes in doors comprising a template plate a at right angle to a lock plate again at a right angle to a reverse plate. The template plate and reverse plate each contain rectangular apertures for drill passage, and the template plate further has zee bracket sleeves on the bottom and both sides of the rectangular aperture for slidably mounting removable plate guides each with different perpendicular cylindrical extension guide for drills of varying sizes. The lock plate also has a centered circular hole with a tubular drill guide perpendicular to the lock plate.

U.S. Pat. No. 4,715,125, issued Dec. 29, 1987 to Livick, discloses a drilling template for accurately positioning latch holes and lock cutouts in door stiles. The template includes a pair of spaced, parallel, rectangular, frame member that are rigidly interconnected at one end. The frame members straddle a vertical door stile with the interconnecting end firmly against the edge of the stile. Clamps on one frame member are then tightened. A latch hole drilling guide is centered in a plate at the interconnecting end of the frame, and various diameter hole saw guides on removable side plates are positionable at any of a plurality of selected positions along the length of the frame to provide cutout positions for any of many lock backsets.

What is needed is an ultra-thin door marking template which straddles an edge of a door so that the door may be closed in the door frame with the template in place for accurate alignment of the door holes with mating holes on the frame for attaching related hardware and preferably with pencil point size marking holes on both sides of the template to mark both sides of the door for through bolt drilling and to allow drilling from either side of the door and which template is reusable since the marking does not damage the template.

SUMMARY OF THE INVENTION

A primary object of the present invention is to provide a door marking template with one or more configurations of pencil-point-sized marking holes, each configuration of marking holes corresponding to a configuration of screw holes in a fixture to be mounted on the door, the door marking template adapted to straddle an edge of a door in a measured location for marking the location of drill holes to be drilled for installing the fixture on the door so that the drill holes are accurately marked on the door in a fast efficient operation.

An additional object of the present invention in to provide an ultra-thin door marking template in a square U shaped three sided channel which straddles an edge of a door so that the door may be closed in the door frame with the template in place for accurate alignment of the door holes with mating holes on the frame for attaching related hardware.

Another object of the present invention is to provide pencil point size marking holes on both sides of the template to mark both sides of the door for through bolt drilling and to allow drilling from either side of the door and which template is reusable since the pencil marking does not damage the template.

One more object of the present invention is to provide a door marking template which may be easily and inexpensively made of very thin durable plastic or metal or cardboard if desired so that the template has a long lifespan of use.

Yet another object of the present invention is to provide a line visible on the template face interconnecting each configuration of marking holes, thereby distinguishing each configuration of marking holes from each other configuration of marking holes, to assist a user in marking the correct drill locations on the door for each specific door fixture.

In brief, a square U shaped three sided channel made from ultra-thin plastic or metal or cardboard forms a door marking template which straddles an edge of a door so that the door may be closed in the door frame with the template in place for accurate alignment of the door holes with mating holes on the frame for attaching related hardware. Pencil point size marking holes on both sides of the template enable marking either side or both sides of the door (for through bolt drilling) to allow drilling from either side of the door and which template is reusable since the pencil marking does not damage the template. There may be one or more configurations of spaced marking holes on each face of each template with each configuration corresponding to a configuration of screw holes in a door fixture to be attached to the door by a screw means. A line visible on the template face interconnecting each configuration of marking holes assists a user in marking the correct drill locations on the door for each specific door fixture.

A primary advantage of the present invention is that it accurately marks the drill holes on the door in a fast efficient operation.

One more advantage of the present invention is that it allows marking the door with the door closed in the frame for accurate alignment with holes on the frame.

Another advantage of the present invention is that it has small holes for marking only so that it is reusable for marking many doors and is not destroyed by drilling.

An additional advantage of the present invention is that it may be easily and inexpensively manufactured in quantity of thin durable plastic or metal or cardboard.

Yet another advantage of the present invention is that it assists a user in marking the correct drill locations on the door for each specific door fixture.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

In FIGS. 1-13 a template device 20A-20D for marking drill hole locations on doors for mounting door fixtures is formed in a square U shaped three sided channel having two opposing parallel spaced mating sides 21A-21D and 23A-23D and an interconnecting top 24A-24D orthogonal to both sides.

Figure 4:
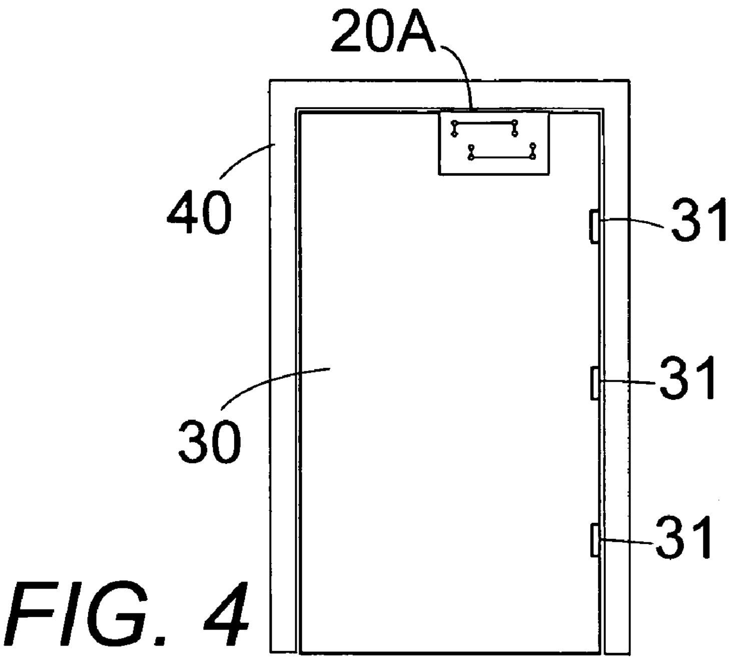
FIG. 4 is a front elevational view of a door and frame showing the template of FIG. 1 positioned for marking on the top of the door with the door closed.
Figure 5:
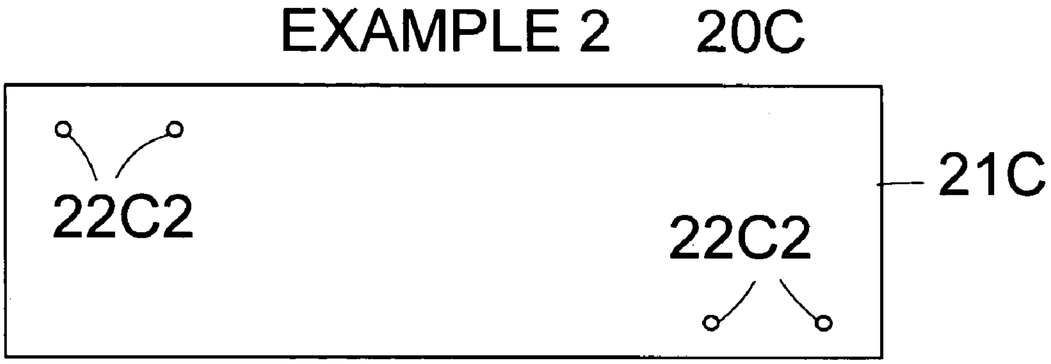
FIG. 5 is a front elevational view of a template having a different size and shape and different hole positions for a different type of door closer.
Figure 6:
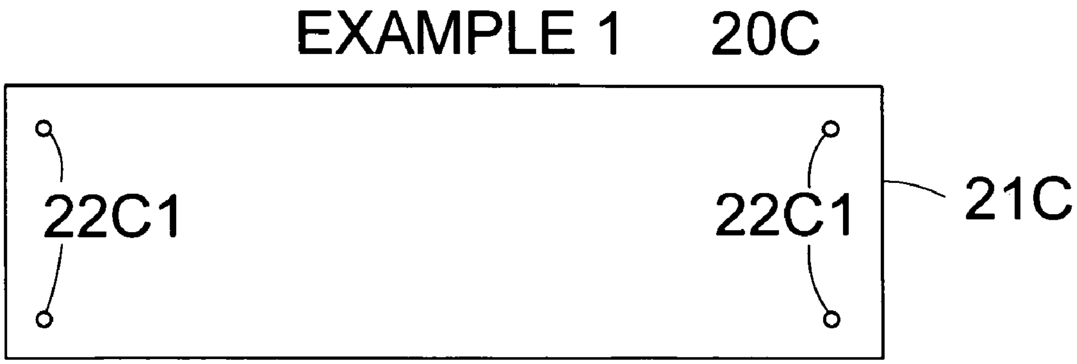
FIG. 6 is a front elevational view of the template of FIG. 5 having different hole positions for a different type of door closer.
Figure 13:
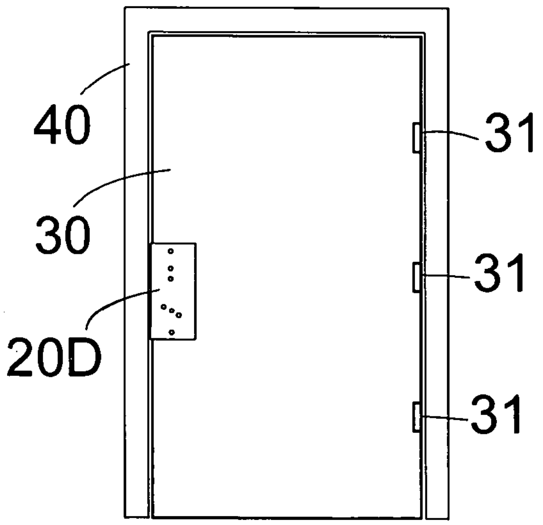
FIG. 13 is a front elevational view of a door and frame showing the template of FIG. 10 positioned for marking on the side edge of the door with the door closed.

The channel shaped template 20A-20D is fabricated of rigid material sufficiently thin to fit between an edge of a door 30 and a door frame 40 when a door is closed, as seen in FIGS. 4 and 13.

Figure 1:
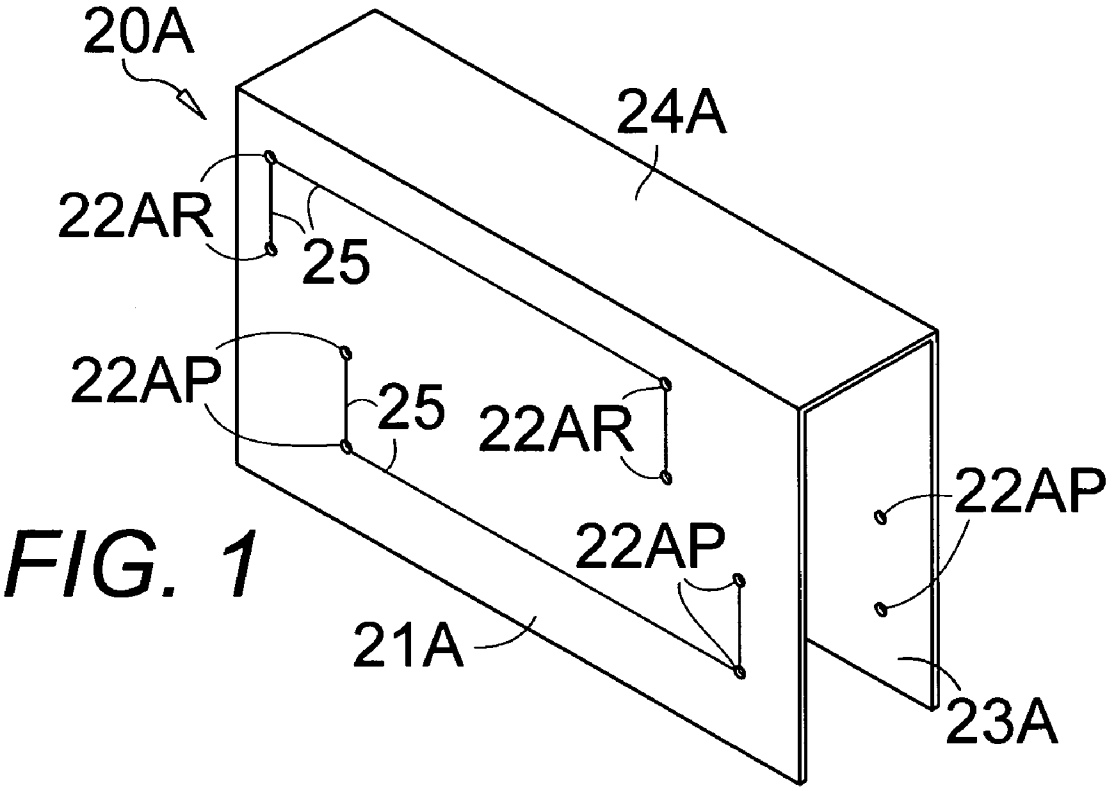
FIG. 1 is a perspective view of the template of the present invention for marking drill holes for a door closer showing the pencil-point-size marking holes on both sides with lines interconnecting the holes for each type of door closer.
Figure 2:
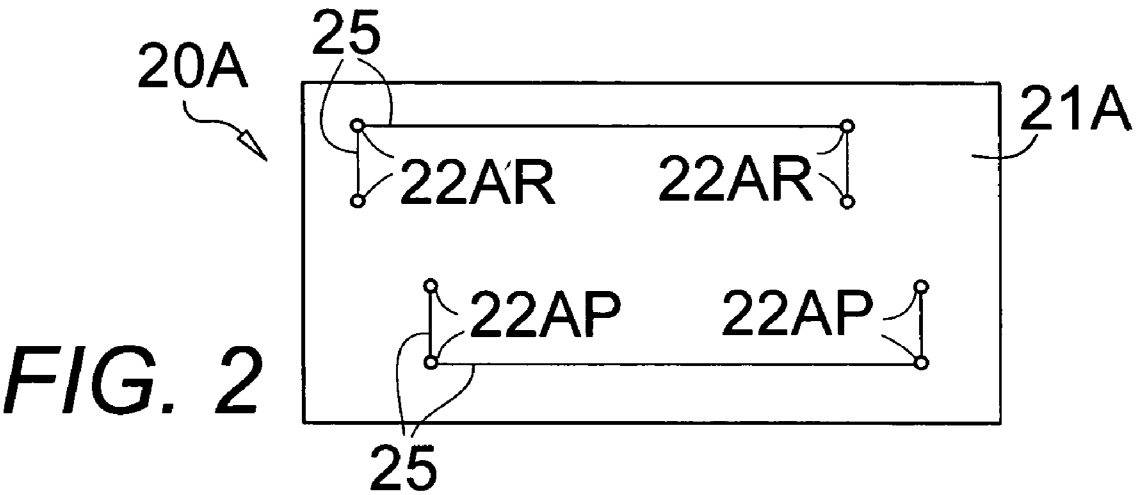
FIG. 2 is a front elevational view of the template of FIG. 1.
Figure 3:
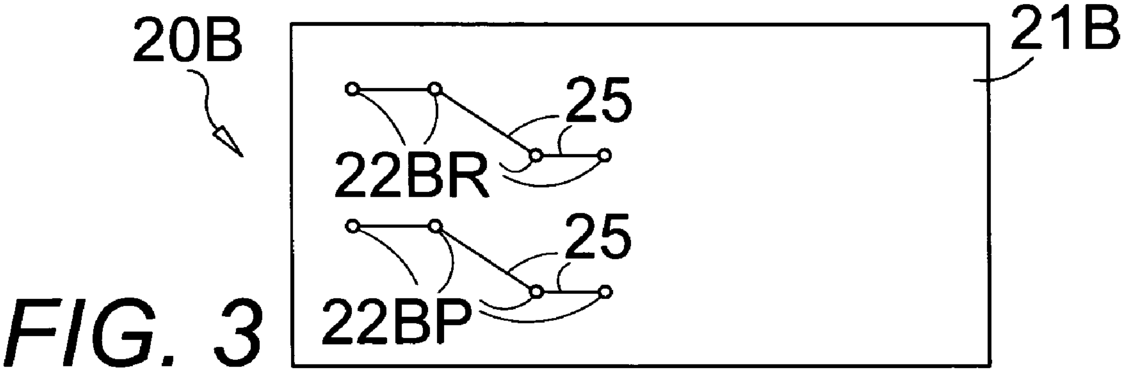
FIG. 3 is a front elevational view of the template of FIG. 1, but with different holes configurations for different door closers.

The channel shaped template 20A-20D has at least one and preferably two mating configurations of spaced pencil-point-size marking holes, 22AR and 22AP in FIGS. 1 and 2, 22BR and 22BP in FIG. 3, on both opposing sides 21A and 23A of the channel, as seen in FIG. 1. Each of the configurations of holes corresponds to a configuration of screw holes in a door mounted fixture to be attached to a door by screw-type attaching means through the fixture holes into a configuration of drill holes marked by the configuration of marking holes on a door.

Figure 7:
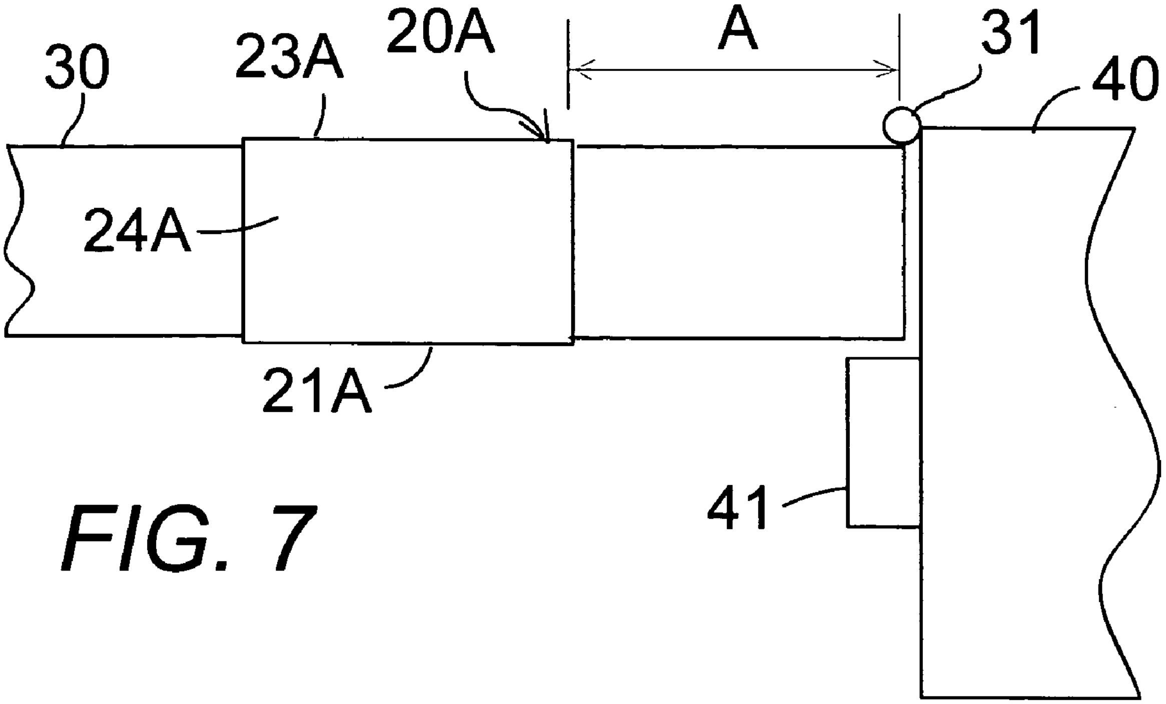
FIG. 7 is a top plan partial view of a door and frame showing the template of FIG. 1 positioned for marking on the top of the door with the door closed.

The channel shaped template 20A-20D is adapted for straddling an edge of a door 30 with the two opposing sides 21A and 23A positioned over a portion of a front and back side of a door and the top 24A over an edge of a door, as seen in FIGS. 4 and 7. The template is adapted for being positioned a measured distance A along an edge of a door and adapted for marking drill hole positions in the configuration of the pencil-point-size marking holes 22AR or 22AP, depending on the fixture, on either or both sides of a door with a door in an open or closed position.

In FIGS. 1-3, when the template comprises at least two configurations of marking holes 22AR and 22AP on each of the two sides, the template further comprises a line 25 visible on each of the template sides interconnecting each of the configurations of marking holes 22AR and 22AP, distinguishing one configuration of marking holes 22AR from the other configuration of marking holes 22AP, to assist the user in marking all the marking holes and only the marking holes for the desired configuration.

The configurations of marking holes each correspond to at least one configuration of screw holes on various door fixtures and hardware such as a door closer fixture using one of the specific marking hole configurations of FIGS. 1-9, or a door lock fixture using the configuration of marking holes of FIGS. 10-13, or a door knob fixture or other types of fixtures or hardware to be mounted to a door. Having the template straddling the door with the door closed for marking insures that the marked positions for drilling will line up properly with any mating fixture parts or hardware attached to the frame, such as a lock on the door with a plate on the frame or one arm of an air cylinder door closer mounted on the door and the other arm mounted on the frame. Providing marking holes only large enough for a pencil or other marking implement in the preferably rigid plastic template discourages the use of the marking holes for drilling and therefore insures an extended life of the template which can be used over and over for marking doors.

Figure 8:
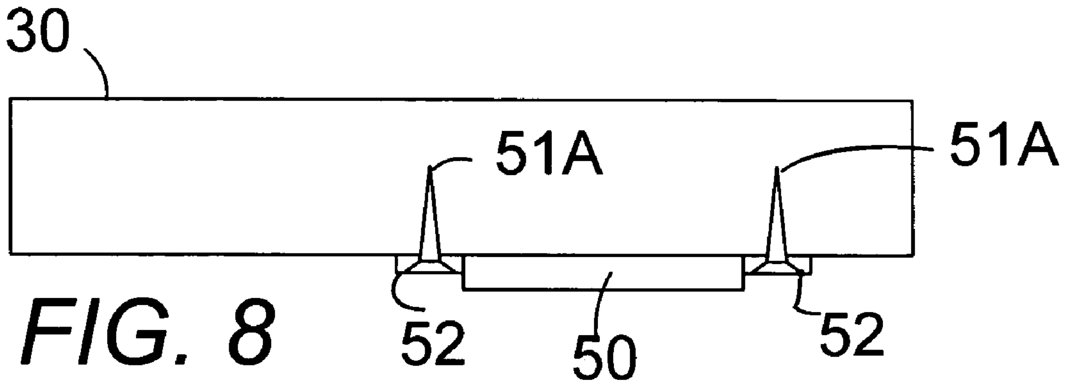
FIG. 8 is a top plan partial view of a door with a door closer plate attached to one side of the door with wood screws.
Figure 9:
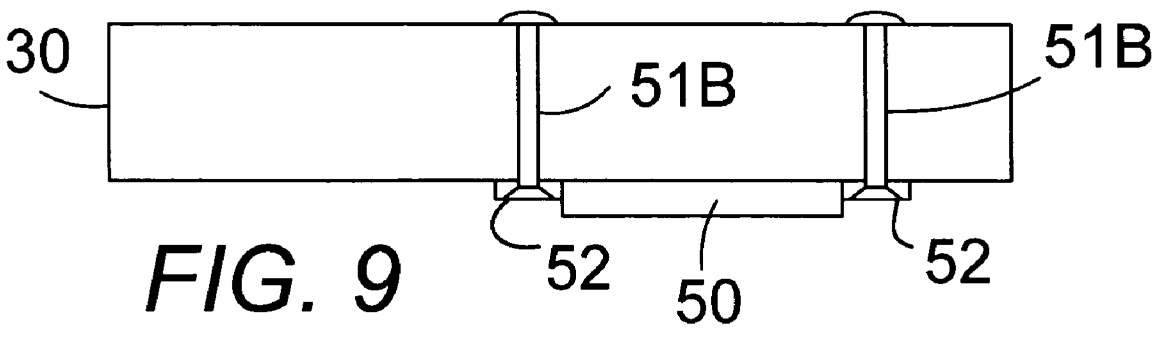
FIG. 9 is a top plan partial view of a door with a door closer plate attached to both sides of the door with bolts through the door.
Figure 10:
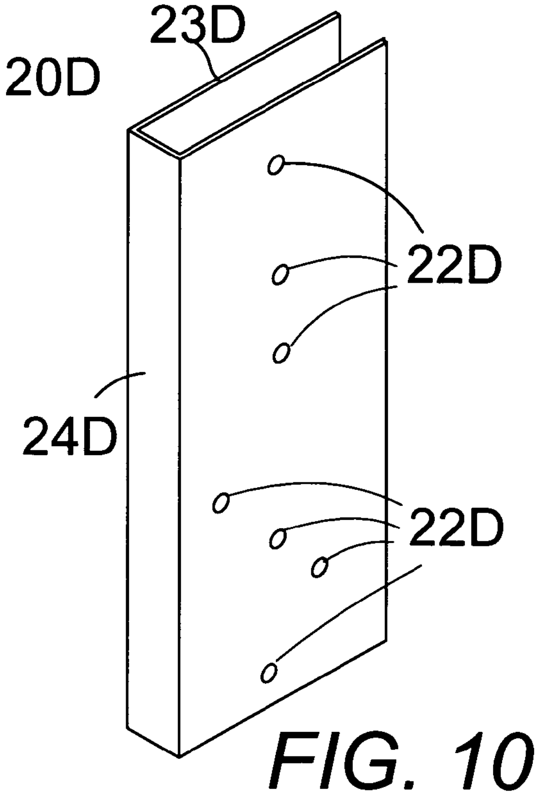
FIG. 10 is a perspective view of a template of the present invention for marking drill holes for a door lock showing the pencil-point-size marking holes on both sides.
Figure 11:
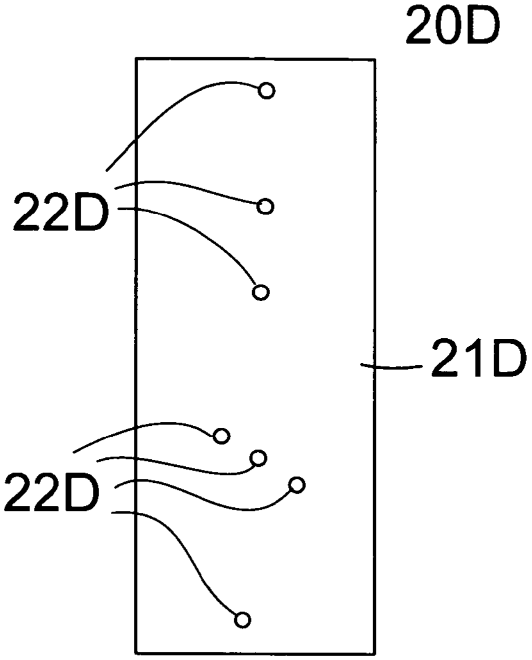
FIG. 11 is a front elevational view of the template of FIG. 10.
Figure 12:
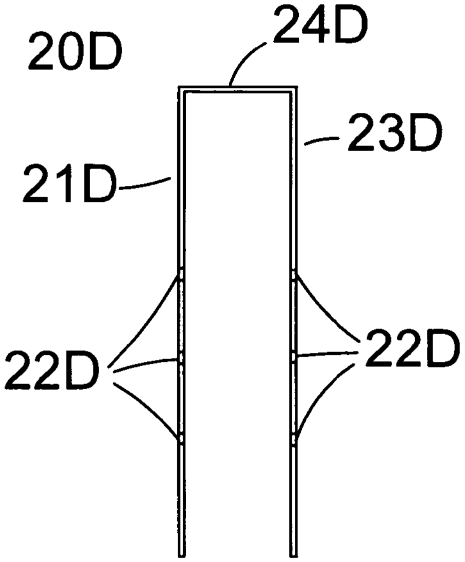
FIG. 12 is an end elevational view of the template of FIG. 10 showing the pencil-point-size marking holes on both sides.

Having mating configurations of marking holes 22AR and 22AP on both sides 21A and 23A of the channel shaped template 20A, as seen in FIG. 1, enables marking on either or both sides of the door. Marking on one side of the door is sufficient for drilling only on one side of the door 30 for a door fixture 50 which is mounted on the door with screws 51A through the fixture screw holes 52, as seen in FIG. 8. Marking on both sides of the door is required for drilling through the door 30 for a door fixture 50 which is mounted on the door with bolts 51B through the fixture screw holes 52, as seen in FIG. 9.

In practice, a door closer template 20A straddles the top edge of the door 30 a measured distance A, as seen in FIGS. 4 and 7, and a marking implement used to mark the door 30 through the desired configuration of marking holes 22AR or 22AP. A door lock template 20D straddles a side edge of a door 30 at the measured height for marking the door through the marking holes 22D, as seen in FIGS. 10-13.

The channel shaped template is preferably fabricated from an ultra-thin rigid material including ultra-thin plastic, ultra-thin metal and ultra-thin cardboard.

It is understood that the preceding description is given merely by way of illustration and not in limitation of the invention and that various modifications may be made thereto without departing from the spirit of the invention as claimed.

What is claimed is:

1. A template for preparing a door for mounting hardware comprising:

first and second spaced apart, aligned, substantially parallel faces with first and second sets of perforations, the position of each set of perforations congruent with the position of mounting holes of door hardware;

a third perpendicular face connecting the first and second faces to form a channel;

a first group of two or more lines connecting and identifying the first set of perforations in the template; and a second group of two or more lines connecting and identifying the second set of perforations in the template;

wherein the substantially parallel faces are spaced from each other at the third face a distance greater than a thickness of the door and the template is configured to mount over a door edge; and wherein the first group of two or more lines are, at least in part, not aligned.

2. The template of claim 1 where the door moves between open and closed positions and thicknesses of the template faces are sized to allow the door to move to the closed position with the template mounted on the door edge.

3. The template of claim 1 where;

the positions of the first set of perforations are congruent with mounting holes of a parallel arm door closer; and the positions of the second set of perforations are congruent with mounting holes of a regular arm door closer.

4. The template of claim 1 where the template fits over the door edge without deflection of the substantially parallel faces.

* * * * *